United States Patent
Hikita et al.

(10) Patent No.: US 6,863,177 B2
(45) Date of Patent: Mar. 8, 2005

(54) ELECTRICALLY CONDUCTIVE PROPYLENE RESIN COMPOSITION AND PART-HOUSING CONTAINER

(75) Inventors: Osamu Hikita, Hirakata (JP); Satoshi Kosugi, Hirakata (JP); Hidehiko Funaoka, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 306 days.

(21) Appl. No.: 09/951,628

(22) Filed: Sep. 14, 2001

(65) Prior Publication Data

US 2002/0022687 A1 Feb. 21, 2002

Related U.S. Application Data

(63) Continuation of application No. 09/180,742, filed as application No. PCT/JP97/01580 on May 12, 1999, now abandoned.

(30) Foreign Application Priority Data

May 13, 1996 (JP) .......................................... 08-117876

(51) Int. Cl.$^7$ ............................................. B65D 85/66
(52) U.S. Cl. ...................................... 206/389; 524/528
(58) Field of Search ......................... 206/389; 524/528

(56) References Cited

U.S. PATENT DOCUMENTS

| | | | |
|---|---|---|---|
| 4,002,595 A | 1/1977 | Adelman | 428/625 |
| 4,038,042 A | 7/1977 | Adelman | 428/625 |
| 4,321,162 A | 3/1982 | Guffens et al. | 252/571 |
| 4,420,534 A | 12/1983 | Matsui et al. | 428/372 |
| 4,457,973 A | 7/1984 | Matsui et al. | 428/372 |

FOREIGN PATENT DOCUMENTS

| | | |
|---|---|---|
| EP | 0 267 610 | 5/1988 |
| JP | 61-209207 | 9/1986 |
| JP | 62-104810 | 5/1987 |
| JP | 62-104811 | 5/1987 |
| JP | 62-104812 | 5/1987 |
| JP | 62-104813 | 5/1987 |
| JP | 62-132948 | 6/1987 |
| JP | 1-311106 | 12/1989 |
| JP | 1-318011 | 12/1989 |
| JP | 2-166104 | 6/1990 |
| JP | 3-124748 | 5/1991 |
| JP | 3-181535 | 8/1991 |
| JP | 6-156562 | 6/1994 |
| JP | 8-92440 | 4/1996 |
| JP | 8-92470 | 4/1996 |
| JP | 8-109295 | 4/1996 |

*Primary Examiner*—Peter D. Mulcahy
(74) *Attorney, Agent, or Firm*—Wenderoth, Lind & Ponack, L.L.P.

(57) ABSTRACT

A conductive propylene resin composition, which is used for packaging and automatic feeding of parts which is unlikely be electrically charged, which is resistive to a baking treatment and which does not produce wastes and can reduce a material cost and a processing cost, is provided.

The composition contains of

(1) a % by weight of a propylene polymer with a portion having not less than 95% by weight of crystallinity that occupies not less than 60% by weight of the propylene polymer, and contains not more than 20% by weight of ethylene;

(2) b % by weight of a propylene random copolymer which has a tensile elongation of not less than 100% and contains 1 to 7% by weight of ethylene; and (3) c % by weight of an electrically conductive filler, wherein the following relationships are satisfied: $a+b+c=100$, $0.5 \leq a/b \leq 2.0$ and $10 \leq c \leq 30$.

6 Claims, 2 Drawing Sheets

Fig. 1

1 part carrier
2 shutter section
3 protruding portion
4 feeding hole
5 part carrier tape 6 spring portion
7 recessed portion
8 connecting section
9 connecting section
10 electronic part

ELECTRICALLY CONDUCTIVE PROPYLENE RESIN COMPOSITION AND PART-HOUSING CONTAINER

This is a continuation of Ser. No. 09/180,742, filed Feb. 16, 1999, now abandoned which is a 371 of PCT/JP97/01580, filed May 12, 1997.

TECHNICAL FIELD

The present invention relates to a conductive polypropylene resin composition which has superior mechanical properties, heat resistance and electric conductivity, is capable of being re-used, and is used mainly for packaging and automatic feeding of electronic parts, and also relates to a part-housing container made from such an electrically conductive polypropylene resin composition.

BACKGROUND OF THE INVENTION

With respect to feeding parts, a part-feeding method of the taping system has proven to have high reliability in mounting (or packaging) electronic parts and have been widely used recently, providing a main method for supplying parts. In this part-feeding method, parts, packaged in part carriers connected into a tape form, are charged into an automatic feeder in the packaged state and automatically fed one by one. However, in the part-feeding of the taping system, since part-carrier tapes, such as paper tapes and embossed tapes, constituting the part-packaging containers are disposed after their use, it has been pointed out that they cause large amounts of industrial wastes with an increase of the use of parts. To solve this problem, part-carrier tapes which are capable of being re-used have been proposed as disclosed in Japanese Laid-Open Patent Publication 156562/1994 (Tokukaihei 6-156562).

With respect to resin materials for the part-carrier tapes, in the case of the application to general mechanism assembling parts, a polypropylene resin has been used because of its advantages in mechanical properties (rigidity, hinge strength), heat resistance, moldability, re-usability, recycling property (re-moldability after size reduction) and costs.

In the case of the application to housing containers for electronic parts, electric conductivity is particularly required so as to prevent electrostatic breakdown in electronic parts; however, when carbon is added to the conventional polypropylene resin so as to impart electric conductivity, its mechanical strength is extremely reduced with the result that it cannot be put into practical use. Therefore, conventionally, a conductive polystyrene resin to which carbon is added has been applied. Here, the hinge strength is defined by the number of repeated bending operations which are carried out by a hinge tester until separation under the condition of right-to-left bending angles of 45 degrees, a load of 800 g and a bending speed of 60 times per minute, and the hinge strength required for sufficient recycling property is regarded as not less than 100 times.

However, in the case of housing, in particular, semiconductor packages as packaging containers for electronic parts, the following problems are encountered. At present, since not less than 90% of the semiconductor packages are epoxy resin molded packages with high hygroscopicity, the packages tend to absorb water in the presence of moisture. If these moistened packages, as they are, are soldered in a reflow furnace, water contained inside the mold packages abruptly becomes water vapor, causing the packages to explode and to be damaged. Therefore, it is necessary to carry out a so-called baking process for heating and drying the packages at approximately 125° C. prior to assembling and mounting the packages. However, the above-mentioned conductive polystyrene resin is inferior in heat resistance, and can not resist baking at 120° C. or higher. Consequently, it is necessary to prepare counter-measures such as baking the electronic parts in a separate manner immediately before mounting (or packaging) them, or baking the electronic parts separately and then housing and sealing them into the container by applying top tapes, etc. thereto.

In recent years, there have been continual efforts to develop a conductive polypropylene resin which is superior in mechanical properties, has high heat resistance, reduces costs, and also does not emit toxic substances even when it is disposed or burnt. However, those materials that are made by adding carbon to a polypropylene resin having a low crystallinity so as to impart conductivity unfortunately have insufficient rigidity, and when they are used for the carrier tapes for the electronic parts, they provide an insufficient part-retaining force through a shutter portion for pressing the electronic parts, and the containers are susceptible to deformation due to external forces applied upon transportation; thus, it is not possible to put them into practical use due to low reliability in mounting. On the other hand, those materials made by adding carbon to a polypropylene having a high crystallinity have sufficient rigidity. However, they have insufficient hinge strength, and are subject to fatigue in the shutter portion due to repeated opening and closing processes, thereby providing a low re-usable property and failing to allow for practical use. As described above, those containers made from the conventional conductive propylene resin unfortunately provide insufficient rigidity or hinge strength although they have the heat resistance, thereby failing to provide sufficient reliability in mounting and re-using property.

Moreover, from the standpoint of efficiency, the above-mentioned part carrier tapes, etc. should be wound up onto a reel and baked as they are together with the packaged parts. However, most of the conventional reel materials, which are made from a paper material or a resin material as in the containers, can not be baked together with the parts. Only reels made of expensive aluminum can be baked together with the parts.

DISCLOSURE OF THE INVENTION

In order to solve the above-mentioned problems, the objective of the present invention is to provide a conductive resin composition, and in particular, a conductive polypropylene resin composition and a part-housing container, which is used for packaging parts and for automatic feeding thereof, is difficult to be electrically charged, is resistant to baking, does not produce wastes because it can be re-used, and reduces a material cost and a processing cost.

The inventors of the present invention have researched mechanical characteristics of various resin compositions, with the result that they have found that the factors noted below must be set at not less than certain values respectively in order to achieve the respective features: bending elastic modulus (or flexural modulus) in order to achieve rigidity required for improving the reliability in mounting; tensile elongation in order to achieve hinge strength required for improving recycling property; and thermal deformation temperature in order to obtain improved heat resistance to the heating process. In particular, in order to use the resin composition as electronic part-housing containers, sufficient electric conductivity and moldability are also required.

In the present invention, in order to achieve the above-mentioned objective, the rigidity, hinge strength, heat resistance and moldability of the conductive propylene resin compositions have been researched. As a result, it has been found that the following physical properties are selected as measures for these features, and that when those physical properties are in the following ranges, the conductive resin compositions achieve the objective of the present invention.

Accordingly, the present invention provides an electrically conductive resin composition in which:

(1) a bending elastic modulus serving as a measure for rigidity (at 23° C.) is
   (a) not less than 21000 kgf/cm² in the case of a composition used for a large part or a reel, or
   (b) not less than 15000 kgf/cm² in the case of a composition used for a small part;

(2) a tensile elongation serving as a measure for the hinge strength (at 23° C.) is not less than 8%;

(3) a thermal deformation temperature (HDT) serving as a measure for heat resistance is
   (a) not less than 130° C. under a stress condition of 4.6 kgf/cm² in the case of the composition used for the large part or the reel, or
   (b) not less than 130° C. under a stress condition of 2.0 kgf/cm² or not less than 115° C. under a stress condition of 4.6 kgf/cm² in the case of the composition used for the small part; and (4) a melt flow rate serving as a measure for moldability is the range of 5 to 150 g/10 min.

With respect to the above physical properties of the conductive resin composition, the bending elastic modulus is a property obtained by measuring a stress which causes a predetermined amount of deformation in accordance with ASTM, D790M;

the tensile elongation is a property which is defined by an elongation (at 23° C.) at the breakage point in a tensile test in accordance with ASTM, D638;

the thermal deformation temperature (HDT) is a property obtained by measuring a temperature which causes a predetermined amount of deformation under a constant load in accordance with JIS, K6758; and the melt flow rate (MFR) is a property that is defined by a weight of sample that is extruded for 10 minutes under a condition of a load of 2.16 kg at 230° C. in accordance with ASTM, D1238.

Here, the above-mentioned large part is specifically exemplified by an electric part, such as a large-size switch and a large-size relay, and a so-called mechanical part. Moreover, the above-mentioned small part is specifically exemplified by mainly chip-type surface-mounted electronic part that is mounted by a so-called general-use electronic-part packaging machine such as QFP (quad flat package) and (small outline package).

The present invention picks up the properties that the electrically conductive resin composition should have so as to solve the aforementioned problems, and selects the appropriate ranges of the respective properties. Therefore, the electrically conductive resin composition of the present invention is not intended to be limited by the kind of the electrically conductive resin compositions as long as it has the above-mentioned specific properties; however, it is particularly preferable to use a conductive propylene resin composition having the above-mentioned properties (that is, a composition comprising a propylene polymer as a base material obtained by polymerizing a propylene monomer or a propylene monomer and another monomer (such as ethylene) which is copolymerized therewith).

In the present invention, the term "electrically conductive" used herein means that upon application of the resin composition in various modes, the electric conductivity of the resin composition is such that it prevents electrostatic breakdown due to accumulated electric charges, and more specifically, the property varies depending on applications of the resin composition; generally, this property is obtained by allowing the resin composition to contain an electric conductive filler. In the present invention, a measure for the conductivity is a resistance (or a volume resistivity), and normally, when the resistance is not more than $10^8$ ohm·cm, and more preferably at not more than $10^6$ ohm·cm, the resin composition is sufficiently applicable to, for example, the electronic-part containers, etc. Therefore, in the preferred embodiment, the resin composition of the present invention has the above-mentioned resistance.

The above-mentioned various specific properties are properties that the entire composition including the filler exhibits, and with respect to a preferable composition of the present invention, there is exemplified an electrically conductive propylene copolymer composition which contains at least 70% by weight of a conductive propylene resin composition (for example, a propylene polymer composition made of (a) at least one propylene polymer selected from the group consisting of a propylene homopolymer and a propylene-ethylene copolymer, and (b) at least one propylene-ethylene random copolymer) and at least 5% by weight of the electrically conductive filler.

More specifically, the conductive polypropylene resin composition having the above specific properties comprises the following:

(A) a propylene polymer with a large bending elastic modulus, which has a specific crystallinity and a specific ethylene content (including a case in which an ethylene content is zero);

(B) a propylene copolymer of a random type with a large tensile elongation, which has a specific ethylene content; and (C) an electrically conductive filler for adding electric conductivity and for increasing rigidity inherently contained therein, wherein (A+B) is at least 70% by weight and C is at least 5% by weight based on the entire composition.

Therefore, in one aspect of the present invention, the electrically conductive polypropylene resin composition is characterized in that it contains:

(1) a % by weight (a>0) of the propylene polymer A which has a portion having not less than 95% by weight of crystallinity that occupies not less than 60% by weight of the propylene polymer A and which contains not more than 20% by weight of ethylene;

(2) b % by weight (b>0) of the propylene random copolymer B containing 1 to 7% by weight of ethylene which has the tensile elongation (23° C.) of not less than 100%; and (3) c % by weight (c>0) of the electrically conductive filler C, wherein the following relationships are satisfied:

$a+b+c=100$, $0.5 \leq a/b \leq 2.0$, and $10 \leq c \leq 30$.

In the present invention, the crystallinity of the propylene polymer A and a ratio of the potion thereof having the specific range of crystallinity are calculated by iso-tactic pentad fraction that is obtained through the nuclear magnetic resonance absorption method (NMR); the tensile elongation of the propylene copolymer B is given as an elongation (at 23° C.) at the breakage point in a tensile test in accordance with the above mentioned ASTM, D638; and the melt flow rate is given by a weight of a sample that is extruded for 10 minutes under a condition of a load of 2.16 kg at 230° C. in accordance with ASTM, D1238.

Here, in addition to the NMR, the crystallinity may be measured by other methods, such as DSC (differential thermal analysis), X-ray diffraction, solvent solubility rate or density, and in this case, it is required that at least one measured value virtually satisfies the requirement of the above-mentioned propylene polymer A.

In a particularly preferable embodiment of the present invention, the above-mentioned conductive polypropylene resin composition further contains an elastomeric (or elastic or elastmic) resin. In this embodiment, the electrically conductive polypropylene resin composition of the present invention is characterized in that it contains:

(1) a % by weight (a>0) of the propylene polymer A which has a portion having not less than 95% by weight of crystallinity that occupies not less than 60% by weight of the propylene polymer A and which contains not more than 20% by weight of ethylene;

(2) b % by weight (b≧0) of the propylene random copolymer B containing 1 to 7% by weight of ethylene which has the tensile elongation (23° C.) of not less than 100%;

(3) c % by weight (c>0) of the conductive filler C; and (4) d % by weight (d>0) of an elastomeric resin D which has a tensile elongation of not less than 100% at 23° C., exhibits rubbery elasticity at −20° C. and has a glass transition point at not more than −20° C., wherein the following relationships are satisfied:

$$a+b+c+d=100,$$

$$0.5 \leq a/(b+d) \leq 29.0, \text{ and}$$

$$5 \leq c \leq 30.$$

In the above-mentioned composition, "rubbery elasticity" is a property that is well-known to one of ordinary skill in the art, and does not need to be specifically explained; for example, "rubbery elasticity" written by Ryogo Kubo (published by Shoukabou Publishing Co., Ltd.) explains the property. Moreover, the glass transition point is a property that is measured by the DSC (Differential Scanning Calorimeter) in accordance with JIS, K7121.

The present invention makes it possible to provide the electrically conductive resin composition, in particular, the electrically conductive propylene resin, which has the superior rigidity, hinge strength, heat resistance, electric conductivity and moldability. Therefore, the electric conductive resin composition of the present invention is applicable to the part-housing containers for housing and automatically feeding the electronic parts as well as to the general mechanical parts.

Therefore, the electrically conductive propylene resin composition of the present invention is used to provide an electronic part carrier which has a recessed section for receiving and keeping an electronic part therein, a shutter section(s) which is placed at an opening of the recessed section and which is closably opened so as to prevent jump-out of the electronic part, a pair of fit-in connecting sections formed on a front edge and a rear edge respectively of the recessed section and feeding holes (sprocket holes) formed on both sides of the recessed section; thus a plurality of the carriers are connected through the connecting sections so as to form an elongated tape-shaped part carrier tape. Such a carrier or a part carrier tape has the following advantages:

The carrier or the part carrier tape has the superior mechanical properties, is difficult to be electrically charged and is resistant to the baking process; therefore, it is applicable to packaging and automatic feeding of the electronic parts with high reliability, is capable of being re-used, prevents the electrostatic breakage of the electronic parts, and is also can be baked together with the electronic parts.

The conductive propylene resin composition of the present invention is used to provide a reel used for the part carrier tape, which is made of a main shaft around which the part carrier tape is wound and a pair of flanges formed on both of the ends of the main shaft so as to house the wound tape; and such a reel has the following advantages:

The reel has the superior mechanical properties, is difficult to be electrically charged and is resistant to the baking process; therefore, it is applicable to packaging and automatic feeding of the electronic parts with high reliability, is capable of re-used, prevents the electrostatic breakage of the electronic parts, and more particularly can be baked together with the electronic parts and the carrier tape for the electronic parts without the need for disassembling the package.

In the drawings, reference numeral 1 indicates a part carrier; 2 indicates a shutter section; 3 indicates a protruding section; 4 indicates a feeding hole; 5 indicates a part carrier tape; 6 indicates a spring section; 7 indicates a recessed section; 8 and 9 indicate connecting sections; 10 indicates an electronic part; 11 indicates a reel; 12 indicates a flange; and 13 indicates a baking device.

PREFERRED EMBODIMENT OF THE INVENTION

Next, the conductive propylene resin composition of the present invention will be explained in detail.

As described earlier, the propylene resin composition of the present invention contains, as its main ingredients, the propylene polymer A, the propylene random copolymer B and the conductive filler C, and optionally the elastomeric resin D on demand; and may contain other ingredient(s) supplementally, if necessary, as long as it is not inconsistent with the objective of the present invention.

The propylene polymer A is preferably has a portion having not less than 95% by weight and more preferably not less than 97% by weight of the crystallinity which portion occupies not less than 60% by weight and more preferably not less than 70% by weight of the whole polymer, and it contains not more than 20% by weight and more preferably not more than 16% by weight (for example 5 to 15% by weight) of ethylene; and its average molecular weight on the number basis is preferably for example in the range of about 8000 to 100000 and more preferably about 8000 to 20000. As long as the aforementioned property values of the electrically conductive resin composition of the present invention are satisfied, the propylene polymer A may be a homopolymer of polypropylene. Therefore, the polypropylene polymer A may be a polymer obtained by polymerizing propylene monomer or propylene monomer and ethylene monomer, which polymer has the aforementioned specific properties.

Such propylene polymer A may be manufactured by using, for example, a method disclosed in the following patent documents:

Japanese Laid-Open Patent Publication No. 61-209207, Japanese Laid-Open Patent Publication No. 62-104810, Japanese Laid-Open Patent Publication No. 62-104811, Japanese Laid-Open Patent Publication No. 62-104812, Japanese Laid-Open Patent Publication No. 62-104813, Japanese Laid-Open Patent Publication No. 1-311106, Japanese Laid-Open Patent Publication No. 1-318011 and Japanese Laid-Open Patent Publication No. 2-166104.

For example, the following catalyst is preferably used so as to provide a high crystallinity with ease. That is, propylene and ethylene are polymerized by using an α-olefin polymerizing catalyst that is made by allowing a halide of Mg, Ti to contact an olefin under the presence of an organic aluminum compound and an organic silicon compound.

With respect to such a propylene polymer A, for example, commercially available BC08AHSW (MFR=80), BC06C (MFR=60), MAIHB (MFR=20), MA04(MFR=40), etc., manufactured by Nippon Polychem Co., Ltd. are used.

The propylene random copolymer B has a tensile elongation of not less than 100% and contains 1 to 7% by weight, more preferably 2.5 to 7% by weight and for example, 2.5 to 5% by weight of ethylene; and its average molecular weight on the number basis is, for example, in the range of about 8000 to 100000, and more preferably about 10000 to 60000. This copolymer B is obtained by the production methods of propylene copolymer that are well-known to one of ordinary skill in the art. For example, propylene and ethylene are randomly polymerized by a commonly-used catalyst of Ziegler type; this method is preferable since the crystallinity of a resulting polymer is suppressed to a certain degree, making it possible to increase its tensile elongation. It is noted that in the case when the elastomeric resin D is contained in the resin composition, the propylene random copolymer B may be omitted.

With respect to such a polypropylene random copolymer B, for example, commercially available MG2T (MFR=15), MG05BS (MFR=45), MG03D (MFR=30), etc., manufactured by Nippon Polychem Co., Ltd. are used.

It is noted that the average molecular weight on the number basis of the polymer (or copolymer) used in the present specification is measured by the GPC (Gel Permeation Chromatography) method in accordance with ASTM D3536-91.

The propylene polymer A and the propylene random copolymer B may be blended by the reactor blend in the same process such as multi-step polymerization, or may be blended by the post reactor blend upon granulation after each has been polymerized. Alternatively, they may be blended by the pellet blend of the respective polymers.

The kind of the conductive filler C is not particularly limited as long as it can impart the electric conductivity required for a given application of the resin composition; and its amount also is not particularly limited as long as it satisfies the specific formulas and allows the conductive resin composition to stay in the range for exhibiting the aforementioned specific properties.

Materials, such as mono-filament carbon whose length is for example not more than 10 mm or its chopped strand, carbon powder (carbon black, etc.) whose average particle diameter is not more than 500 µm, Ketjen-black (KETJEN BLACK) and so on, are preferably used. Materials other than carbon, such as metal fillers, for example, Cu powder, may be used. Combination of the above fillers may of course be used.

More preferably, the application of mono-filament carbon having a length of not more than 5 mm, or the carbon black or Ketjen-black whose average particle diameter is not more than 200 µm makes it possible to avoid degradation in the mechanical properties, and degradation in the tensile elongation in particular. Specifically, Ketjen-black EC600DJ commercially available from Mitsubishi Chemical Co., Ltd., fiber carbon HTA-C3-3R commercially available from Toho Rayon Co., Ltd., etc. may be used.

These fillers are more preferably subjected to a surface treatment (such as a silicone coating treatment), which increases the mechanical strength of a resulted molded product.

From the viewpoint of the electric conductivity and the mechanical strength of products formed from the resin composition, an amount of addition of the filler C, which is in the aforementioned specific amount, may be most preferably in the range of 10 to 20% by weight in the case of the carbon mono-fiber, and in the range of 13 to 25% by weight in the case of carbon black, with or without using the elastomeric resin D. Further, the amount may be in the range of 6 to 10% by weight in the case of Ketjen-black with using the elastmic resin D.

The elastomeric resin D is not particularly limited as long as it is a resin that exhibits the aforementioned specific property values. The elastomeric resin D preferably has a tensile elongation of not less than 500% (at 23° C.) and/or a glass transition point of not more than −50° C. More specifically, a low density polyethylene (LDPE), a linear low density polyethylene (LLDPE), an ethylene-propylene rubber (EPR), a styrene-butadiene rubber (SBR) and natural rubber may be applied. In particular, a polyethylene polymerized by a metallocene catalyst is preferable because it exhibits sufficient rubber elasticity and is inexpensive.

Such elastomeric resin D has an average molecular weight on the number basis in the range of about 10000 to 200000 and more preferably about 8000 to 30000; for example, EG8180 commercially available from Dow Chemical Co., Ltd., EP02P commercially available from Japan Synthetic Rubber (JSR) Co., Ltd., etc. may be adopted.

The method of blending the propylene polymer A, the propylene random copolymer B and the conductive filler C as well as the optional elastomeric resin D is not particularly limited as long as the ingredients are sufficiently kneaded. For example, it may be carried out by blending upon resin granulation, or may be carried out by master-batch blending. In the case of blending upon granulation, for example, the filler may be side fed upon biaxial extrusion. By uniformly blending/kneading the composition based upon the blending rate of compositions according to the present invention, it becomes possible to obtain the electrically conductive polypropylene resin having the superior rigidity, hinge strength, heat resistance, electric conductivity, and moldability.

Kneading may be carried out by a banbury mixer, a kneade-ruder, a mono-axial extruder, a biaxial extruder, a gear pump, etc., or these machines may be used in a combined manner. More preferably, the carbon is strongly kneaded by a banbury mixer or a biaxial extruder into a master batch, and then kneaded with the polypropylene, or the carbon is side-fed, in order to improve the dispersing property of the carbon; thus, it becomes possible to improve the mechanical strength and conductivity. The kneading machine is not particularly limited as long as it can knead the resin and the filler sufficiently.

In the electrically conductive resin composition of the present invention, if the portion of the propylene polymer A having a crystallinity of not less than 95% by weight is less than 60% by weight, or if the ethylene content exceeds 20% by weight, the bending elastic modulus (or bending modulus) of the resin composition after blending is normally lowered, which is not favorable.

In the resin composition of the present invention, if the ethylene content of the propylene random copolymer is less that 1% or if the tensile elongation thereof is less than 100%, the tensile elongation of the polypropylene resin composition is normally lowered, which is not favorable. Moreover, if the content of ethylene content exceeds 7% by weight, the bending elastic modulus of the polypropylene resin composition is normally lowered, which is not favorable.

In the resin composition of the present invention, in the case of the absence of the elastomeric resin D, if a blending ratio (a/b) of the propylene polymer A to the propylene random copolymer B is less than 0.5, the bending elastic modulus of the propylene resin composition is lowered, and if the ratio exceeds 2.0, the tensile elongation of the propylene resin composition is lowered, which is not favorable. In the case of the absence of the elastomeric resin D, the resin composition of the present invention is particularly applicable to the large part and the reel, etc.; and in this case, the resin composition preferably has a bending elastic modulus of at least 21000 kgf/cm$^2$.

Moreover, in the conductive resin composition of the present invention containing the elastomeric resin D, if the blending ratio a/(b+d) is less than 0.5, the bending elastic modulus is normally lowered, for example with the result that the bending elastic modulus is smaller than 15000 kgf/cm$^2$; therefore, the resin composition generally is not applicable to the part-housing container from the viewpoint of a force for retaining the part and the rigidity, and its heat resistance is also lowered. Furthermore, if the ratio exceeds 29, the tensile elongation is lowered, which is not favorable.

Additionally, regardless of the absence or the presence of the elastomeric resin D, the bending elastic modulus of the resin composition is particularly preferably not less than 21000 kgf/cm$^2$ from the view point of the retaining force especially in the case of the application of the resin composition to the large part, and from the view point of the heat resistance, dimension stability and prevention of deflection in the case of the application to the reel.

In the resin composition of the present invention, if the conductive filler C is less than 10% by weight (or if it is less than 5% by weight in the case of the presence of the elastomeric resin D), the bending elastic modulus and the electric conductivity of the propylene resin composition are lowered; and in contrast, if it exceeds 30% by weight, the tensile elongation and the moldability of the polypropylene resin composition are lowered, and the material costs increase in the both cases; therefore, these cases generally are not favorable.

In particular, in the electrically conductive resin composition of the present invention containing the elastomeric, resin D, when Ketjen-black is used as the conductive filler C and it is used in the range of 5 to 10% by weight, sufficient electric conductivity required for avoiding an adverse effects due to kneading intensity and a kneading number is available; therefore, the application of Ketjen-black is particularly preferable since it makes the production management of the resin composition easier and since it causes less reduction in the physical properties.

It is rioted that in the propylene resin composition of the present invention, it is possible to add various additive agents in accordance with objectives of the composition if necessary, as long as the addition does not adversely affect on the objectives of the present invention. With respect to the usable additive agents, various anti-oxidants, neutralizers, crystallization nucleation agents, anti-static agents, light-resistant stabilizers, ultraviolet-ray absorbents, inorganic fillers, slip agents, dyes, pigments, peroxides, etc. are listed. Normally, an added amount of these additive agents is preferably not more than 20 parts to 100 parts of the electrically conductive propylene resin composition.

The propylene resin composition of the present invention has a melt flow rate (MFR) in the range of 5 to 150 g/10 min., and preferably in the range of 10 to 80 g/10 min. If the melt flow rate is lower than 5 g/10 min., the moldability is lowered, and if it exceeds 150 g/10 min., the bending elastic modulus is lowered due to a low degree of polymerization; therefore, these conditions are not favorable. In the resin composition of the present invention, the polymer A and the copolymer B having the aforementioned specific properties are used so that it is generally possible to achieve such a predetermined melt flow rate.

Moreover, it is also possible to make adjustments by increasing or decreasing the melt flow rate using methods that are well-known to one of ordinary skill in the art. For example, it is possible to change the melt flow rate in an auxiliary manner by properly selecting molecular weights of the polymers used in the composition (more concretely, changing the molecular weights of the polymer A, the polymer B and/or the resin D) and/or by adding other ingredient (for example, a peroxide) as described above, if necessary.

If the melt flow rate is smaller than 5 g/10 min., the moldability generally deteriorates, failing to fit to injection molding. Further, if the melt flow rate exceeds 150 g/10 min., the mechanical strength generally deteriorates.

Next, referring to the Drawings, explanations will be given of one embodiment of an electronic part-housing container to which the polypropylene resin composition of the present invention is applied.

Figure 1:
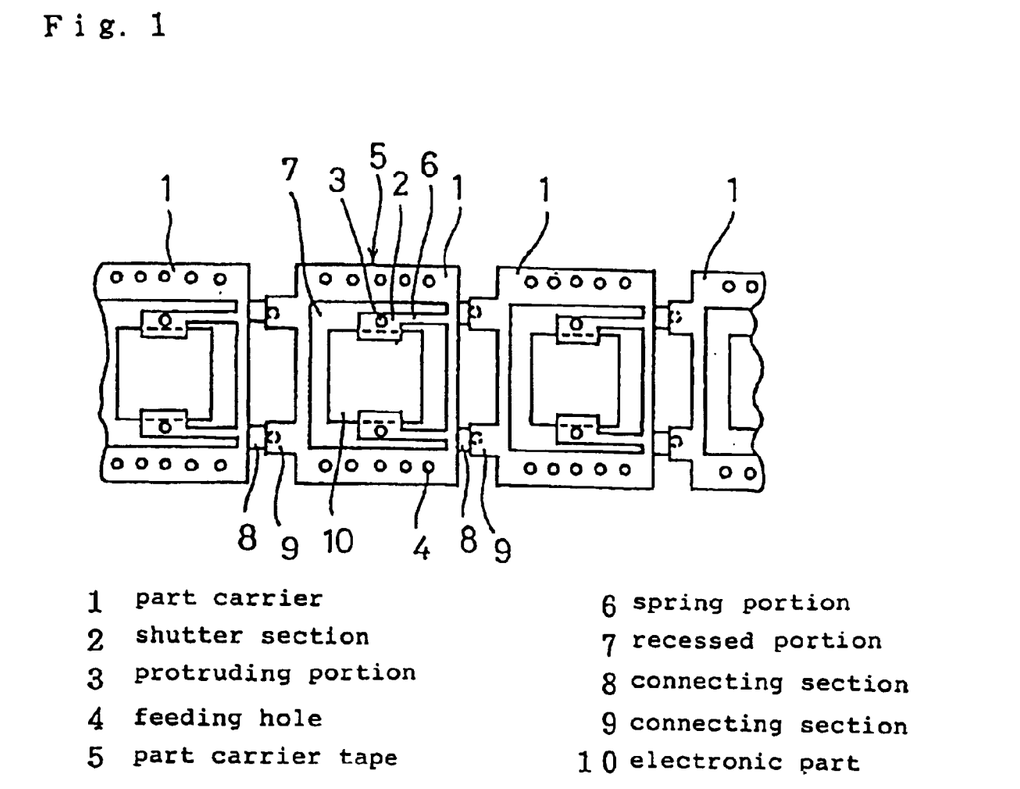
FIG. 1 is a schematic plan view showing a portion of one embodiment of a part carrier tape that is formed by using an electrically conductive resin composition of the present invention.
Figure 2:
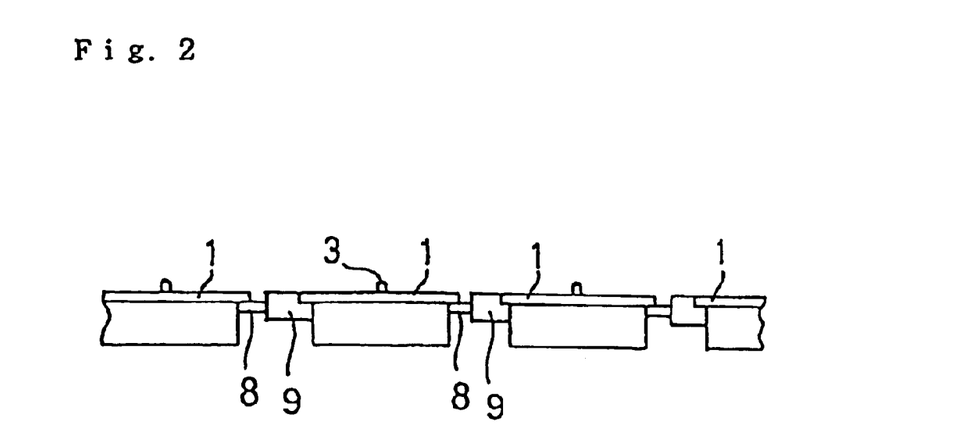
FIG. 2 is a schematic front view of the part carrier tape of FIG. 1.

FIG. 1 (plan view) and FIG. 2 (front view) schematically show a part carrier tape of the present invention. The part carrier tape 5 is constituted by a plurality of part carriers 1 (four of them are shown in FIG. 1), and these carriers 1 are formed from the conductive propylene resin composition of the present invention. Each of them is provided with a recessed section 7 for housing and supporting an electronic part 10 therein, a shutter section 2 constituted by a protruding portion 3 and a spring portion (or an elastic portion) 6 that section is located on an opening of the recessed section 7 and that is elastically opened and closed by external operations so as to prevent the electronic part 10 from being out, a pair of fit-in connecting sections 8 and 9 that are formed on peripheral edges at the front of and the back of the recessed section 7, and feeding holes 4 that are formed on the upper and the lower side edges. A number of these carriers 1 are connected into an elongated long tape form through the pairs of the connecting sections 8 and 9.

The part carrier tape 5 has the superior mechanical properties, is difficult to be electrically charged, and is resistant to the baking treatment; therefore, it is applied to packaging and automatic feeding of the electronic part 10 with high reliability, can be re-used (recycled), prevents electrostatic breakdown of the electronic part 10, and can be baked together with the electronic parts 10.

Figure 3:
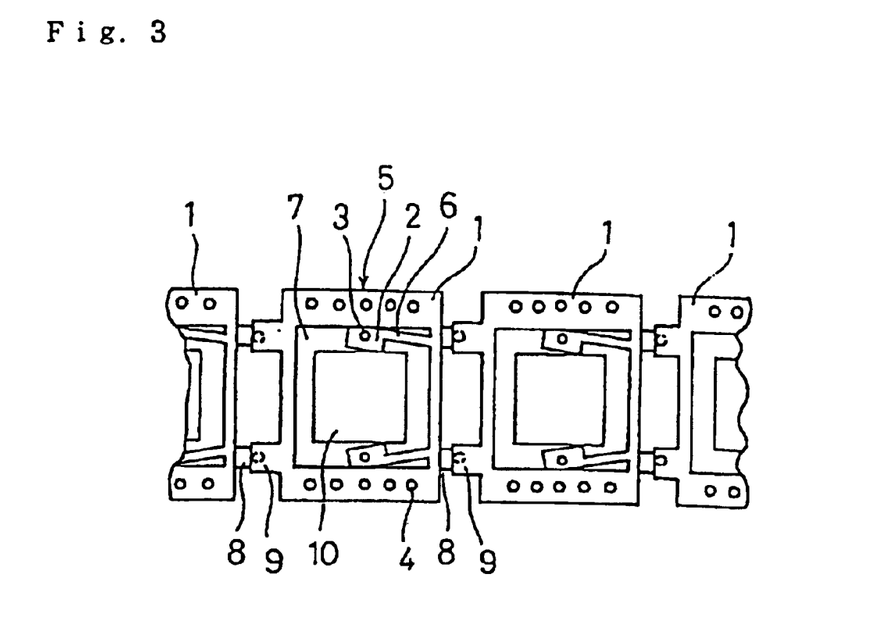
FIG. 3 is a schematic plan view showing a portion of the part carrier tape that is formed by using the conductive resin composition of the present invention wherein a shutter sections are in their opened state.

FIG. 3 schematically shows the part carrier tape 5 in which its shutter sections 2 are opened. In this state, the electronic parts 10 can be taken out of the carrier 1. Although not shown in this Figure, while the part carrier tape 5 is being loaded on an automatic feeder, the protruding portions 3 are operated to carry out the opening operation and closing operation by guides, etc. provided with the automatic feeder so that the shutter sections 2 are opened and closed, thereby making it possible to take out (or to receive) the electronic parts 10 and to supply (or to remove) it to (or from) mounting positions.

Figure 4:
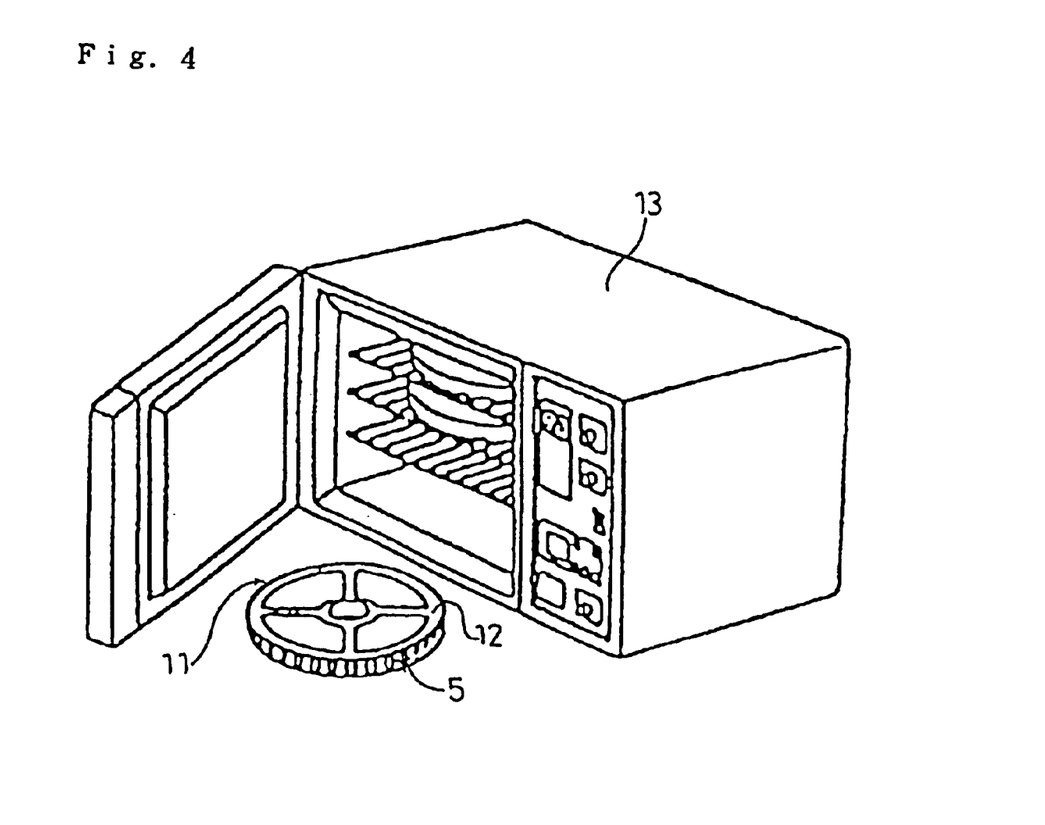
FIG. 4 is a schematic perspective view showing one embodiment of a reel for a carrier tape which is formed by using the conductive resin composition of the present invention and which can be baked as it is.

FIG. 4 shows a reel used for the carrier tape in accordance with the present invention. The reel 11 for the carrier tape, which is made of the polypropylene resin composition of the present invention, is constituted by a main shaft around which the part carrier tape 5 is wound and a pair of flanges 12 attached to both ends of the main shaft for receiving the wound-up tape 5. The reel 11 for carrier tapes has the superior mechanical properties, is difficult to be electrically charged and is resistant to the baking treatments; therefore, it is applied to packaging and automatic feeding of the electronic part 10 with high reliability, can be recycled, prevents electrostatic breakdown of the electronic part 10, and, in particular, can be baked together with the electronic parts 10 and the part carrier tape 5 in a baking device 13 without the need for disassembling the package.

Although not shown in the drawings, the reel 11 for carrier tape is loaded on the automatic feeder, the part carrier tape 5 is drawn therefrom, and then, as described above, the electronic parts 10 are taken out (or received) and supplied (or removed) to (or from) the mounting positions.

The constructions of such a parts carrier, such a carrier tape and such a reel for the carrier tape are, for example, disclosed in Japanese Laid-Open Patent Publication No. 6-156562, and the contents of disclosure of the present specification contain the contents of the disclosure of the above Laid-Open Patent Publication by the reference to it.

INDUSTRIAL APPLICABILITY

The present invention makes it possible to provide the electrically conductive resin, in particular, the propylene resin, which has the superior rigidity, hinge strength, heat resistance, conductivity and moldability. Therefore, it is applicable to the part-housing containers for housing and automatic feeding the electronic parts as well as to general mechanical parts.

The present invention provides the part carrier tape, and the part carrier tape has the superior mechanical properties, is difficult to be electrically charged and is resistant to the baking treatment; therefore, it is applied to packaging and automatic feeding of the parts with high reliability, can be recycled, particularly prevents the electrostatic breakdown of the electronic parts, and can be baked together with the electronic parts. Therefore, it becomes possible to reduce the material cost and the processing cost without forming wastes.

The present invention provides the reel for the carrier tape, and the reel for the carrier tape has the superior mechanical properties, is difficult to be electrically charged, and is resistant to the baking treatment; therefore, it is applied to packaging and automatic feeding of the parts with high reliability, can be recycled, particularly prevents the electrostatic breakdown of the electronic parts, and can be baked together with the electronic parts and the part carrier tape without the need for disassembling. Therefore, it becomes possible to reduce the material cost and the processing cost without forming wastes.

PRIOR ART EXAMPLES, COMPARATIVE EXAMPLES AND EXAMPLES OF THE INVENTION

Next, explanations will be given of the conductive propylene resin composition of the present invention in detail. It is noted that for comparison, prior-art examples and comparative examples were also carried out.

First, with respect to the case without containing the elastomeric resin D, the blending compositions and the results of evaluation of two prior-art examples, three comparative examples and two examples of the present invention are shown in Table 1, Table 2 and Table 3. Here, "ratio of highly crystallized portion" in the Tables refers to the ratio of a portion whose crystallinity is not less than 95%.

It is noted that upon blending ingredients, carbon was side-fed by using a biaxial extruder in comparative example 1 and a mono-axial extruder was used in comparative example 1. In comparative example 3, a banbury mixer was used to prepare a master batch whose carbon composition was double, and then it was blended by a biaxial extruder so as to be set to a predetermined value. In comparative examples 4 and 5 which will be described later, the blending was carried out in the same manner as comparative example 3. In example 1, the blending was carried out as in the same manner as comparative example 1; in example 2, a mono-axial extruder was used; in examples 3 and 4, the blending was carried out in the same manner as in comparative example 3; and in example 5, the blending was carried out in the same manner as in comparative example 1.

TABLE 1

| Item | Unit | Prior art example 1 | Prior art example 2 |
|---|---|---|---|
| Resin base | (Kind) | Polystyrene | Polypropylene |
| Property of polymer A | | | |
| Ratio of highly-crystallized portion | wt % | — | 0 |
| Ethylene content | wt % | — | 0 |
| Property of polymer B | | | |
| Ethylene content | wt % | — | 2.5 |
| Tensile elongation | % | — | 420 |
| a/b | (Ratio) | — | 0 |
| Electrically conductive filler | (Kind) | — | Carbon powder |
| c | wt % | 0 | 15 |
| Property of resin composition | | | |
| Bending elastic modulus | kgf/cm$^2$ | 21000 | 13000 |
| Tensile elongation | % | 20 | 15 |
| Thermal deformation temperature a) | ° C. | 75 | 130 |
| Melt flow rate | g/10 min | — | 12 |
| Resistivity | Ω · cm | — | 6 × 10$^5$ |
| Hinge strength | Number of times | 50 | 42 | a) at 4.6 kgf

TABLE 2

| Item | Unit | Comp. example 1 | Comp. example 2 | Comp. example 3 |
|---|---|---|---|---|
| Resin base | (Kind) | Polypropylene | Polypropylene | Polypropylene |
| Property of polymer A | | | | |
| Ratio of highly-crystallized portion | wt % | 85 | 85 | 90 |
| Ethylene content | wt % | 15 | 15 | 9 |
| Property of polymer B | | | | |
| Ethylene | wt % | — | 3.2 | 2.5 |
| Tensile elongation | % | — | 480 | 420 |
| a/b | (Ratio) | — | 0.4 | 2.2 |
| Electrically conductive filler | (Kind) | Carbon fiber | Carbon fiber | Carbon powder |
| c | wt % | 10 | 10 | 35 |
| Property of resin composition | | | | |
| Bending elastic modulus | kgf/cm$^2$ | 41700 | 16000 | 39000 |
| Tensile elongation | % | 4 | 70 | 3 |
| Thermal deformation temperature a) | °C. | 139 | 125 | 138 |
| Melt flow rate | g/10 min | 42 | 25 | 3 |
| Resistivity | Ω·cm | $8 \times 10^7$ | $8 \times 10^7$ | $2 \times 10^4$ |
| Hinge strength | Number of times | 10 | 711 | 7 | a) at 4.6 kgf

TABLE 3

| Item | Unit | Example 1 | Example 2 |
|---|---|---|---|
| Resin base | (Kind) | Polypropylene | Polypropylene |
| Property of polymer A | | | |
| Ratio of highly-crystallized portion | wt % | 85 | 90 |
| Ethylene content | wt % | 15 | 9 |
| Property of polymer B | | | |
| Ethylene content | wt % | 2.5 | 3.2 |
| Tensile elongation | % | 420 | 480 |
| a/b | (Ratio) | 1.7 | 0.85 |
| Electrically conductive filler | (Kind) | Carbon fiber | Carbon powder |
| c | wt % | 15 | 13 |
| Property of resin composition | | | |
| Bending elastic modulus | kgf/cm$^2$ | 25000 | 32000 |
| Tensile elongation | % | 12 | 40 |
| Thermal deformation temperature a) | °C. | 131 | 138 |
| Melt flow rate | g/10 min | 18 | 35 |
| Resistivity | Ω·cm | $5 \times 10^5$ | $8 \times 10^5$ |
| Hinge strength | Number of times | 483 | 635 | a) at 4.6 kgf

As shown in prior-art example 1, when polystyrene is used solely, its thermal deformation temperature is less than 130° C., and cannot be baked.

In the case when only the random polypropylene copolymer B is used as shown in prior-art example 2, its bending elastic modulus is less than 15000 kgf/cm$^2$, failing to be applied to the part-housing containers in terms of the retaining strength for the parts and rigidity.

In the case when only the highly-crystallized polypropylene is used as shown in comparative example 1, its tensile elongation is far smaller than 20%, causing a low hinge strength; therefore, it is not recycled appropriately.

In the case when a/b is not more than 0.5 as shown in comparative example 2, the bending elastic modulus is less than 21000 kgf/cm$^2$, failing to be applied to housing containers for the large parts in terms of retaining strength for the parts and rigidity. In such a meaning, this composition is dealt as a comparative example; however, when the composition is applied to cases in which the bending elastic modulus may be set at not more than 21000 kgf/cm$^2$ (for example, may be set at least at 15000 kgf/cm$^2$), for example, it is applied to small-part housing containers, comparative example 2 is regarded as one example of the present invention. It is noted that the thermal deformation temperature (under a load of 2 kgf/cm$^2$) of comparative example 2 was 140%.

When a/b exceeds 2 as shown in comparative example 3, its tensile elongation is far smaller than 20%, causing a low hinge strength; therefore, it is not recycled appropriately.

Examples 1 and 2 completely satisfy all the properties required for the resin composition of the present invention; therefore, those compositions can be put into practical use. In particular, in example 1, a/b is set at 1.7, its bending elastic modulus is large, and thus its rigidity is high, thereby providing superior retaining strength for the parts of the shutter. Consequently, these compositions are preferably applied to the part-housing containers for heavy parts. Moreover, in example 2, a/b is set at 0.85, its tensile elongation is large, and so its hinge strength is superior. Therefore, the composition has an improved recycle property and provides long service life as the part-housing container.

Next, with respect to the resin compositions containing the elastomeric resin D, three examples of the present invention are shown together with two comparative examples.

The blending conditions and the evaluation methods are the same as those described earlier, and Table 4 and Table 5 show the blending compositions and the results of the evaluation.

TABLE 4

| Item | Unit | Comp. example 4 | Comp. example 5 |
|---|---|---|---|
| Resin base | (Kind) | Polypropylene | Polypropylene |
| Property of polymer A | | | |
| a | wt % | 20 | 91 |
| Ratio of highly-crystallized portion | wt % | 85 | 100 |
| Ethylene content | wt % | 5 | 0 |
| Property of polymer B | | | |
| b | wt % | 45 | 0 |
| Ethylene content | wt % | 2.5 | — |
| Tensile elongation | % | 350 | — |
| Elastomeric resin D | (Kind) | EPR | LLDPE |
| d | wt % | 10 | 3 |
| Tensile elongation (normal temperature) | % | 880 | 1500 |
| Glass transition point | °C. | −60 | −120 |
| a/(b + d) | (Rate) | 0.4 | 30.3 |
| Electrically conductive filler C | (Kind) | Carbon powder | Ketjen-black |
| c | wt % | 25 | 6 |

TABLE 4-continued

| Item | Unit | Comp. example 4 | Comp. example 5 |
|---|---|---|---|
| Property of resin composition | | | |
| Bending elastic modulus | kgf/cm$^2$ | 7500 | 21000 |
| Tensile elongation | % | 56 | 5 |
| Thermal deformation temperature a) | °C. | 75 | 132 |
| Melt flow rate | g/10 min | 5 | 18 |
| Resistivity | Ω · cm | 8 × 10$^4$ | 7 × 10$^5$ |
| Hinge strength | Number of times | 1523 | 12 | a) at 4.6 kgf

TABLE 5

| Item | Unit | Example 3 | Example 4 | Example 5 |
|---|---|---|---|---|
| Resin base | (Kind) | Polypropylene | Polypropylene | Polypropylene |
| Property of polymer A | | | | |
| a | wt % | 62 | 89 | 82 |
| Ratio of highly-crystallized portion | wt % | 100 | 85 | 85 |
| Ethylene content | wt % | 0 | 7.5 | 7.5 |
| Property of polymer B | | | | |
| b | wt % | 10 | 0 | 0 |
| Ethylene content | wt % | 2.5 | — | — |
| Tensile elongation | % | 350 | — | — |
| Elastomeric resin D | (Kind) | EPR | LLDPE | metallocene LLDPE |
| d | wt % | 3 | 5 | 3 |
| Tensile elongation (normal temperature) | % | 880 | 1500 | 1450 |
| Glass transition point | °C. | −60 | −120 | −120 |
| a/(b + d) | (Rate) | 4.8 | 17.8 | 27.3 |
| Electrically conductive filler C | (Kind) | Carbon powder | Ketjen-black | Carbon fiber 3mm |
| c | wt % | 25 | 6 | 15 |
| Property of resin composition | | | | |
| Bending elastic modulus | kgf/cm$^2$ | 25000 | 16000 | 28000 |
| Tensile elongation | % | 12 | 10 | 9 |
| Thermal deformation temperature a) | °C. | 128 | 121 | 130 |
| Thermal deformation temperature b) | °C. | 145 | 138 | — |
| Melt flow rate | g/10 min | 8 | 21 | 75 |
| Resistivity | Ω · cm | 3 × 10$^5$ | 7 × 10$^5$ | 8 × 10$^5$ |
| Hinge strength | Number of times | 511 | 445 | 380 | a) at 4.6 kgf
b) at 2.0 kgf

In comparative example 4, since the rigidity is insufficient because of the low bending elastic modulus, this composition is not suitable for parts retaining, and further its thermal deformation temperature is quite low. Moreover, in comparative example 5, since the hinge strength is insufficient, this composition is inferior in repeated use, resulting in a problem of the recycling property.

Any of examples 3 to 5 exhibits the specific property values of the present invention; and the compositions of examples 3 and 5 are particularly suitable for the carriers for the large parts and the reels, and the composition of embodiment 4 is particularly suitable for the carriers for the small parts.

What is claimed is:

1. A reusable part-housing container, which is made of an electrically conductive polypropylene resin composition comprising:
   (1) a % by weight (a>0) of a propylene polymer which has a portion having not less than 95% by weight of crystallinity that occupies not less than 60% by weight of the propylene polymer, and which contains not more than 20% by weight of ethylene;
   (2) b % by weight (b>0) of a propylene random copolymer containing 1 to 7% by weight of ethylene which has a tensile elongation (23° C.) of not less than 100%;
   (3) c % by weight (c>0) of an electrically conductive filler,
wherein the following relationships are satisfied:

$a+b+c=100$ $0.5 \leq a/b \leq 2.0$, and $10 \leq c \leq 30$; and said resin composition having a melt flow rate of 10 to 80 g/10 min;
said container comprising:
a recessed section for housing and supporting a part; and
a shutter section for preventing the part from being out of the recessed section, the shutter section being placed at an opening of the recessed section in a manner so as to be opened and closed.

2. A reusable part carrier tape which is formed into a tape form by connecting the part-housing containers according to claim 1.

3. A reusable reel for a tape carrier, which reel is made of an electrically conductive polypropylene resin composition comprising:
   (1) a % by weight (a>0) of a propylene polymer which has a portion having not less than 95% by weight of crystallinity that occupies not less than 60% by weight of the propylene polymer, and which contains not more than 20% by weight of ethylene;
   (2) b % by weight (b>0) of a propylene random copolymer containing 1 to 7% by weight of ethylene which has a tensile elongation (23° C.) of not less than 100%;
   (3) c % by weight (c>0) of an electrically conductive filler, wherein the following relationships are satisfied:

$a+b+c=100$ $0.5 \leq a/b \leq 2.0$, and $10 \leq c \leq 30$; and said resin composition having a melt flow rate of 10 to 80 g/10 min. and around which the reel parts carrier tape according to claim 2 is wound.

4. A reusable part-housing container which is made of a polypropylene resin composition comprising:
   (1) a % by weight (a>0) of a propylene polymer which has a portion having not less than 95% by weight of crystallinity that occupies not less than 60% by weight of the propylene polymer, and which contains not more than 20% by weight of ethylene;
   (2) b % by weight (b≧0) of a propylene random copolymer containing 1 to 7% by weight of ethylene which has a tensile elongation (23° C.) of not less than 100%;

(3) d % by weight (d>0) of an elastomeric resin which has a tensile elongation of not less than 100% at 23° C., exhibits rubber elasticity at −20° C. and has a glass transition point at not more than −20° C.;

(4) c % by weight (c>0) of an electrically conductive filler, wherein the following relationships are satisfied:

$$a+b+c+d=100,$$

$$0.5 \leq a/(b+d) \leq 29, \text{ and}$$

$$5 \leq c \leq 30, \text{ and}$$

said resin composition having a melt flow rate of 10 to 80 g/10 min, said part-housing container comprising:

a recess section for housing and supporting a part; and a shutter section for preventing the part from being out of the recess section, the shutter section being placed at an opening of the recess section in a manner so as to be opened and closed.

5. A reusable part carrier tape which is formed into a tape form by connecting the parts-housing containers according to claim 4.

6. A reusable reel for a tape carrier, which reel is made of a polypropylene resin composition comprising:

(1) a % by weight (a>0) of a propylene polymer which has a portion having not less than 95% by weight of crystallinity that occupies not less than 60% by weight of the propylene polymer, and which contains not more than 20% by weight of ethylene;

(2) b % by weight (b≧0) of a propylene random copolymer containing 1 to 7% by weight of ethylene which has a tensile elongation (23° C.) of not less than 100%;

(3) d % by weight (d>0) of an elastomeric resin which has a tensile elongation of not less than 100% at 23° C., exhibits rubber elasticity at −20° C. and has a glass transition point at not more than −20° C.;

(4) c % by weight (c>0) of an electrically conductive filler, wherein the following relationships are satisfied:

$$a+b+c+d=100,$$

$$0.5 \leq a/(b+d) \leq 29, \text{ and}$$

$$5 \leq c \leq 30, \text{ and}$$

said resin composition having a melt flow rate of 10 to 80 g/10 min.; and around which the reel part carrier tape according to claim 5 is wound.

\* \* \* \* \*